US010422350B2

(12) United States Patent
Herrou et al.

(10) Patent No.: US 10,422,350 B2
(45) Date of Patent: Sep. 24, 2019

(54) FAN HAVING A BLADE ASSEMBLY WITH DIFFERENT CHORD LENGTHS

(71) Applicant: Apple Inc., Cupertino, CA (US)

(72) Inventors: Philippe P. Herrou, Sunnyvale, CA (US); Richard A. Herms, Los Altos, CA (US); Jesse T. Dybenko, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 545 days.

(21) Appl. No.: 15/201,278

(22) Filed: Jul. 1, 2016

(65) Prior Publication Data

US 2017/0002836 A1   Jan. 5, 2017

Related U.S. Application Data

(60) Provisional application No. 62/188,292, filed on Jul. 2, 2015.

(51) Int. Cl.
| | |
|---|---|
| *F04D 29/66* | (2006.01) |
| *F04D 17/16* | (2006.01) |
| *F04D 29/28* | (2006.01) |
| *G06F 1/20* | (2006.01) |

(52) U.S. Cl.
CPC .......... *F04D 29/663* (2013.01); *F04D 17/16* (2013.01); *F04D 29/281* (2013.01); *F04D 29/282* (2013.01); *F04D 29/666* (2013.01); *G06F 1/203* (2013.01)

(58) Field of Classification Search
CPC ....... F04D 29/666; F04D 29/282; F04D 17/15
See application file for complete search history.

(56) References Cited

U.S. PATENT DOCUMENTS

| | | | |
|---|---|---|---|
| 4,474,534 A | 10/1984 | Thode | |
| 5,000,660 A | 3/1991 | Van Houten et al. | |
| 6,554,574 B1 | 4/2003 | Spaggiari | |
| 6,749,401 B2 | 6/2004 | Vanmoor | |
| 6,991,426 B2 | 1/2006 | Pietricola | |
| 8,398,380 B2 | 3/2013 | Duke | |
| 8,678,752 B2 * | 3/2014 | Delvaux | ................. F01D 5/142 |
| | | | 415/119 |

(Continued)

FOREIGN PATENT DOCUMENTS

CN   102465916   5/2012

*Primary Examiner* — Woody A Lee, Jr.
(74) *Attorney, Agent, or Firm* — Kilpatrick Townsend & Stockton LLP

(57) ABSTRACT

A fan includes an impeller having blades of varying chord lengths. The fan includes a fan housing surrounding the impeller. The fan housing includes a protruding region, or throat, separated from each passing blade by a clearance, or throat gap, that varies according to the chord length. During rotation of the impeller, the impeller blades rotate about a rotational axis, passing the protruding region defining a minimum radial gap to the protruding region. Due to their different chord lengths, the impeller blades pass the throat region at different throat gaps. Shorter blades are likely to have lower amplitude static pressures and lower air velocities resulting at the blade tip, and are hence likely to generate a lower amplitude acoustic pulse at the protruding region. The variety of chord lengths modulate the amplitude of the pressure to spread acoustic sound across multiple frequencies thereby reducing peak amplitude of the acoustic sound.

14 Claims, 10 Drawing Sheets

(56) References Cited

U.S. PATENT DOCUMENTS

| | | | |
|---|---|---|---|
| 8,967,525 B2 | 3/2015 | Schneider et al. | |
| 2006/0078423 A1* | 4/2006 | Zheng | F04D 17/04 |
| | | | 415/206 |
| 2007/0154314 A1* | 7/2007 | Jarrah | F04D 29/327 |
| | | | 416/203 |
| 2009/0014581 A1* | 1/2009 | Kebrle | B64C 27/82 |
| | | | 244/17.21 |
| 2012/0321495 A1* | 12/2012 | Duke | F04D 29/281 |
| | | | 417/423.7 |
| 2018/0252237 A1* | 9/2018 | Lin | F04D 25/0613 |

* cited by examiner

FAN HAVING A BLADE ASSEMBLY WITH DIFFERENT CHORD LENGTHS

CROSS-REFERENCE TO RELATED APPLICATION(S)

This application claims the benefit of priority under 35 U.S.C. § 119(e) to U.S. Provisional Application No. 62/188,292, filed on Jul. 2, 2015, and titled "FAN HAVING A BLADE ASSEMBLY WITH DIFFERENT CHORD LENGTHS," the disclosure of which is incorporated herein by reference in its entirety.

FIELD

The described embodiments relate to a fan. In particular, the described embodiments relate to a fan having an impeller with impeller blades of varying chord lengths.

BACKGROUND

Centrifugal fan impellers have blades of equal chord length. This ensures that the impeller will be rotationally mass-balanced by design, and, in the absence of a fan housing or scroll, also ensures that the velocity profile and flow rate of the air leaving each blade passage will be equal. Further, the airflow caused by the blades may include an acoustic output at a frequency related to the rotational speed of the blades.

In some cases, when a fan housing covers the blades, the fan housing may include a protruding region, or "throat," that forms the beginning of the scroll of increasing radius responsible for pressure development in the fan. This throat is separated by a relatively close distance to the blades, or "throat gap." The throat and throat gap are designed in part to redirect part of the airflow away from the tangential/rotational direction and towards a direction normal to the fan outlet plane to the airflow efficiency of the fan. However, a significant jet of air is likely to impinge on and around the throat, thereby increasing static and fluctuating pressures and, hence, the amplitude of the acoustic output. This may cause the fan to generate increased acoustic noise. Further, when the described fan and fan housing are installed in an electronic device, the increased acoustic noise leads to the electronic device producing unwanted noise.

SUMMARY

In one aspect, a fan assembly suitable for use in a consumer electronic device is described. The fan assembly may include an impeller. The fan assembly may further include several impeller blades secured with the impeller. The impeller blades may be configured to rotate with the impeller in response to a rotational force applied to the impeller. In some embodiments, the impeller includes blades of different lengths that follow a pattern that spreads an acoustic output generated while the impeller is rotating to reduce a perception of the acoustic output.

In another aspect, a fan suitable for use in a consumer electronic device is described. The fan may include a blade assembly that may include several blades having variable blade chord lengths. In some embodiments, each of the blades rotates about a common center of rotation.

In another aspect, a method for reducing an acoustic output generated by a fan assembly including an impeller having several impeller blades configured to rotate with the impeller and a fan housing having a protruding region is described. The method may include receiving at the impeller a first impeller blade of the several impeller blades. The method may further include receiving at the impeller a second impeller blade of the several impeller blades. In some embodiments, in response to a rotational force to the impeller, the first impeller blade passes the protruding region at a first distance from the protruding region and the second impeller blade passes the protruding region at a second distance from the protruding region. Also, in some embodiments, the second distance may be different from the first distance.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
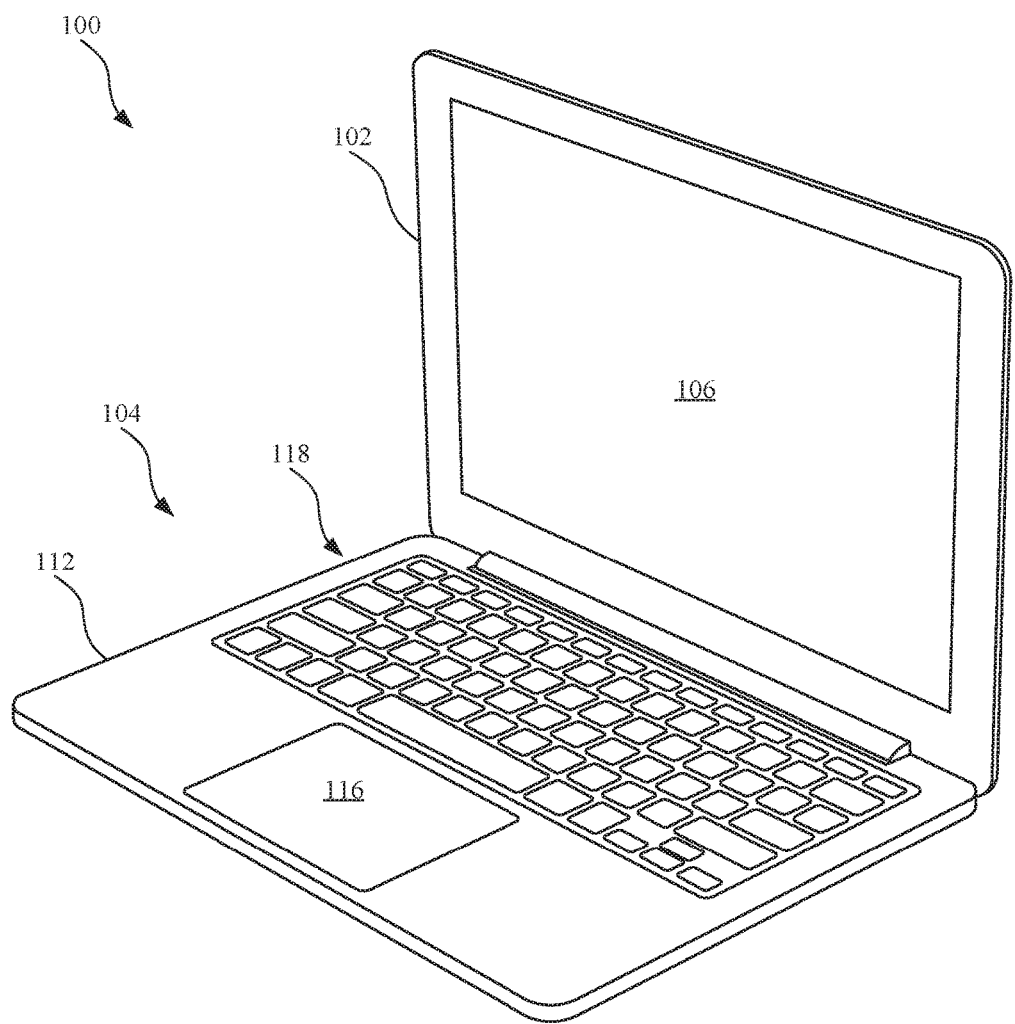
FIG. 1 illustrates an isometric view of an embodiment of an electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The present disclosure describes a fan assembly used in electronic devices, such as portable electronic devices including laptops. The fan assembly may include an impeller with several impeller blades that include a chord length different from chord lengths of other impeller blades of the impeller. In other words, the impeller blades in the present disclosure may be referred to as having varying chord lengths. The "chord length" may be defined as a tip-to-tip, or end-to end, length of an impeller blade. In some cases, the impeller blades vary in length in accordance with a periodic pattern, such as a sinusoidal periodic pattern. The impeller is designed to improve sound performance by reducing an audible tonal sound associated with air movement caused by the rotation of the impeller, while still maintaining sufficient cooling performance for heat-generating components in an electronic device.

The fan assembly in the present disclosure may include a fan housing with a protruding region, or "throat." When a rotational force is applied to the impeller, a distance between the impeller blades and the protruding region varies based upon the different chord lengths of the impeller blades. During operation of the fan assembly, the impeller blades passing the protruding region define a blade passing frequency ("BPF") that may include an audible tonal sound heard by a user of the electronic device. For example, pressure fluctuations, created by air driven by the impeller blades to the protruding region which, depending on the frequency and amplitude of the oscillation, create acoustical energy in the form of audible sound. While air pressure at the protruding region may vary according to the periodic pattern defined by the impeller blades, the acoustic pressure may be reduced based upon impeller blades of a relatively short chord length that drive relatively less air to the protruding region. Thus, the acoustic pressure changes do not remain at a steady-state acoustic pressure in the fan assembly. Also, the peak amplitude of the BPF may be significantly reduced as the number of impeller blades of relatively long chord lengths is reduced. Further, the amplitude may be spread across multiple frequencies. Accordingly, the user may perceive less tonal acoustic output attributed to the fan assembly.

As generally known, the fan assembly is designed to create airflow to either remove heated air from the electronic device or to provide cool air to heat-generating components in the electronic device. In this regard, the fan assembly may include an impeller with several impeller blades designed to drive airflow to one or more locations. A traditional fan assembly may include an impeller with several impeller blades of identical chord length. These impeller blades, extending an equal distance from the impeller, may be disposed in a fan housing having a protruding region, or "throat." Further, this distance is generally minimized such that the volume of air driven by each impeller blade is maximized. When a rotational force is applied to impeller by, for example, a motor, each of the impeller blades passes the protruding region at an equal distance from the protruding region.

The magnitude of the average static pressure at the protruding region is partly related to the chord length of the impeller blades, and instantaneously may follow a periodic pattern over time with a steady amplitude. Also, the amplitude of the BPF tone may be proportional to blade chord length. In this regard, the audible sound associated with the BPF tone may be greater with longer impeller blades. Further, for an impeller rotating at a constant velocity, the amplitude of the BPF forms a peak at a particular frequency. This amplitude may be referred to as a "spike" in that the peak amplitude is significantly higher at this frequency than other frequencies. As such, the tone may include a relatively loud audible sound at the particular frequency that can be heard by the user of the electronic device that includes the impeller. However, by varying the chord length of the blades, the amplitude of the BPF is reduced and the acoustical tonal energy is spread across multiple frequencies, and the user may perceive less noise emanating from the fan assembly.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an isometric view of an embodiment of an electronic device 100. In some embodiments, the electronic device 100 is a desktop computing device with a built-in display. In other embodiments, the electronic device 100 is a video-streaming device. In the embodiment shown in FIG. 1, the electronic device 100 is a consumer electronic device, such as a laptop computer device. As shown, the electronic device 100 may include a display housing 102 coupled with a base portion 104, allowing the display housing 102 to pivot with respect to the base portion 104, and vice versa. In some embodiments, the display housing 102 and the base portion 104 are formed from a metal, such as aluminum or an aluminum alloy. The display housing 102 may include a display panel 106 designed to provide visual content. The base portion 104 may include atop case 112 coupled with a bottom case (not shown). The top case 112 and the bottom case may define a space designed to receive several components (not shown) of the electronic device 100, such as processor circuits, memory circuits, and a battery pack. Also, the base portion 104 may further include several components allowing a user to input one or more controls to the electronic device 100, such as a touch pad 116 and a keyboard 118.

During use of the electronic device 100, some of these components may convert electrical energy into heat energy causing an increase in the temperature of the electronic device 100. To reduce the temperature, the base portion 104 may also include a fan assembly designed to remove the heat from the electronic device 100. This will be described and shown below.

Figure 2:
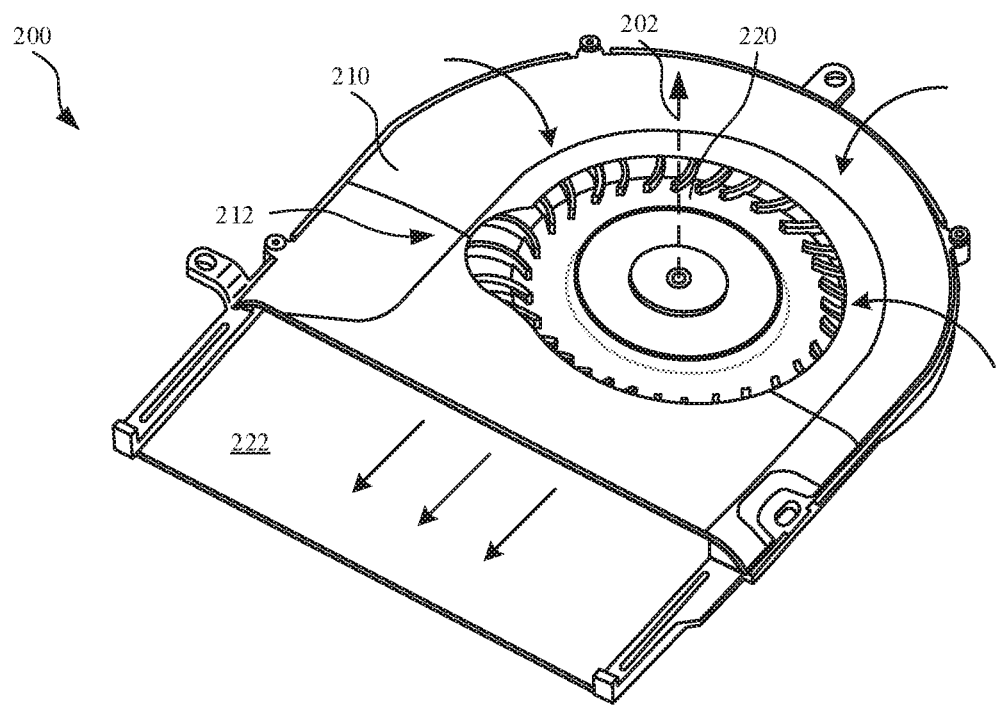
FIG. 2 illustrates an isometric view of an embodiment of a fan assembly suitable for use in an electronic device, in accordance with the described embodiments.

FIG. 2 illustrates an isometric view of an embodiment of a fan assembly 200 suitable for use in an electronic device (such as the electronic device 100 shown in FIG. 1), in accordance with the described embodiments. In some embodiments, the fan assembly 200 is a centrifugal fan designed to drive a volume of air radially outward from the center of the fan assembly 200. As shown, the fan assembly 200 may include a fan housing 210 designed to cover an impeller 220 that includes several impeller blades. The fan housing 210 may include an opening 212 that allows air to pass through the fan housing 210 to the impeller 220. When a rotational force is applied to the impeller 220 by, for example, a motor, the impeller 220 rotates about a rotational axis 202 at the center of the impeller 220 and the impeller blades receive the air through the opening 212 and drive the air to an outlet region 222 of the fan assembly 200. The air paths are denoted as arrows in FIG. 2. In some cases, the air received through the opening 212 is heated air generated by one or more components of an electronic device.

Figure 3:
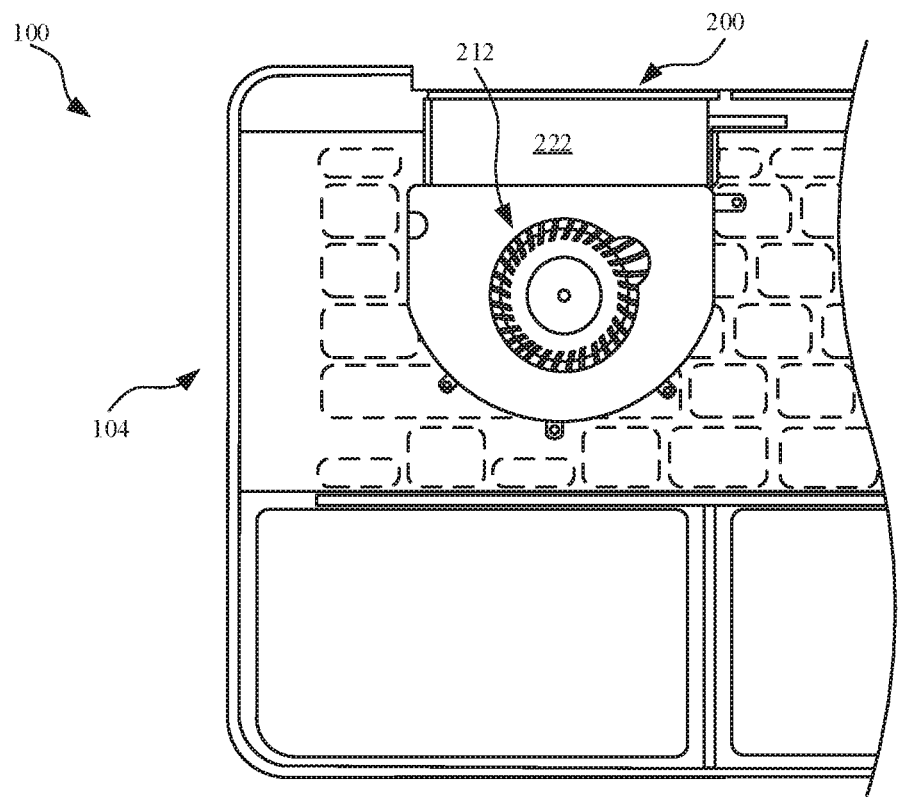
FIG. 3 illustrates a partial plan view of an interior region of the base portion of the electronic device, with the fan assembly disposed in the base portion.

FIG. 3 illustrates a partial plan view of an interior region of the base portion 104 of the electronic device 100, with the fan assembly 200 disposed in the base portion 104. The bottom case is removed to show detail. The outlet region 222 of the fan assembly 200 may be positioned near a vent or opening (not shown) of the base portion 104. In this manner, heated air from internal components (not shown) in the base portion 104 enters the opening 212 of the fan assembly 200 and exits the outlet region 222 to the vent or opening of the electronic device 100 thereby removing heat from the electronic device 100.

Figure 4:
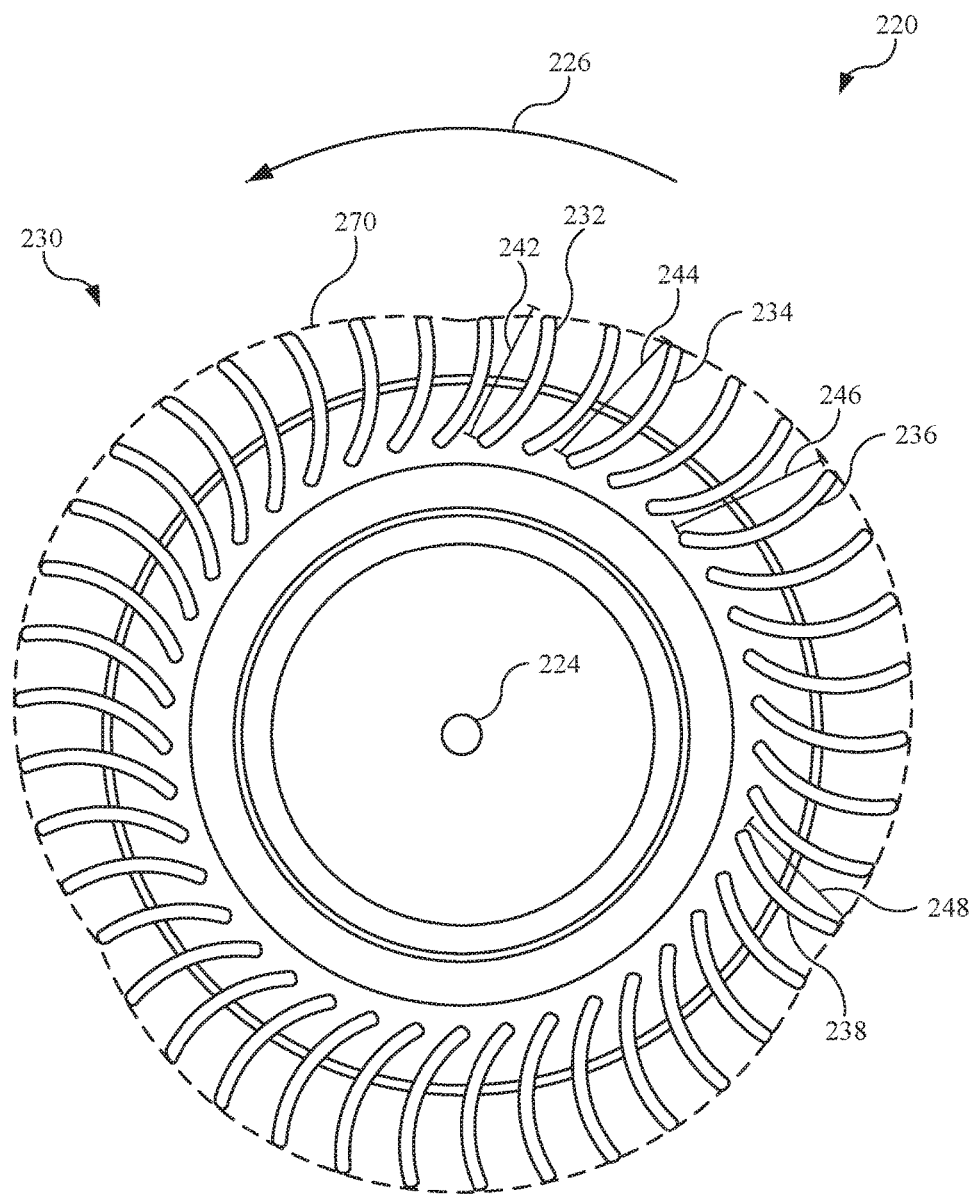
FIG. 4 illustrates a plan view of an embodiment of an impeller, in accordance with the described embodiments.

FIG. 4 illustrates a plan view of an embodiment of the impeller 220, in accordance with the described embodiments. Several components of the fan assembly 200 shown in FIG. 2 (such as the fan housing 210) are removed for purposes of illustration. As shown, the impeller 220 includes impeller blades 230, which may be referred to as a blade assembly of the impeller 220, positioned around a center 224 of the impeller 220, with the center 224 defining a common center of rotation of the impeller blades 230. In some embodiments, the impeller 220 is formed from a metal. In the embodiment shown in FIG. 4, the impeller 220 is formed from a polymeric material, such as plastic. In this regard, the impeller 220 may be formed from various techniques, such as injection molding, compression molding, or other techniques known in the art for molding plastic materials. Also, in some embodiments, the impeller 220 includes 20 or more impeller blades. In the embodiment shown in FIG. 4, the impeller 220 includes 41 impeller blades. Each impeller blade may include a chord length measured from a first edge (of the impeller blade) to a second edge opposite the first edge. Further, a first edge is positioned closer to the center 224 relative to a second edge, and in this regard, the first edge may be referred to as a leading edge and the second edge may be referred to as a trailing edge. As shown, the impeller 220 may be designed to rotate in a counterclockwise rotation, denoted by a direction of an arrow 226, such that during rotation of the impeller 220, with respect to the mean direction of air flowing past the blades, the leading edge "leads" the trailing edge. In other words, the trailing edge "lags" the leading edge.

Fan assemblies generally known in the art include impeller blades of equal lengths that define a circular path. However, the impeller blades 230 may include varying chord lengths. For example, the impeller blades 230 may include a first impeller blade 232 having a first chord length 242 and a second impeller blade 234 having a second chord length 244 different from the first chord length 242. As shown, the second chord length 244 is greater than the first chord length 242. The impeller blades 230 may further include a third impeller blade 236 having a third chord length 246 different than the first chord length 242 and the second chord length 244. As shown, the third chord length 246 is greater than the second chord length 244, and accordingly, greater than the first chord length 242. FIG. 4 further shows the impeller blades 230 including a fourth impeller blade 238 having a fourth chord length 248 different from the third chord length 246. As shown, the fourth chord length 248 is less than the third chord length 246. Also, despite the uneven chord lengths of the impeller blades 230, the impeller blades 230 shown in FIG. 4 as well as various impellers in this detailed description, may include evenly spaced blades. In other words, the blade spacing between adjacent impeller blades is the same, or approximately the same.

As shown in FIG. 4, the impeller blades 230 are sized and positioned to define a periodic pattern 270 (denoted by dotted lines) extending around the circumference of the impeller 220. A "periodic pattern" refers to a design that is repeated at predetermined intervals. For example, the impeller blades 230 may be positioned along the impeller 220 according to a sine wave that is known to repeat. Accordingly, the periodic pattern 270 may include a periodic function, such as a sinusoidal periodic function representing a sine wave. It will be appreciated that the periodic pattern 270 may also represent a cosine wave. Also, although not shown, in other embodiments, the periodic pattern 270 is defined by another mathematical equation, which may include a linear and/or non-linear component.

Each of the impeller blades 230 shown in FIG. 4 may include a length approximately in the range of 10 to 30 millimeters. However, the size may be different in other embodiments but including blade lengths of greater dimensions. Also, the variance between the impeller blade having the greatest length and the impeller blade having the shortest length is approximately in the range of 5 to 30%. In other words, the shortest impeller blade may be 5% to 30% shorter in chord length than that of the longest impeller blade.

Figure 5:
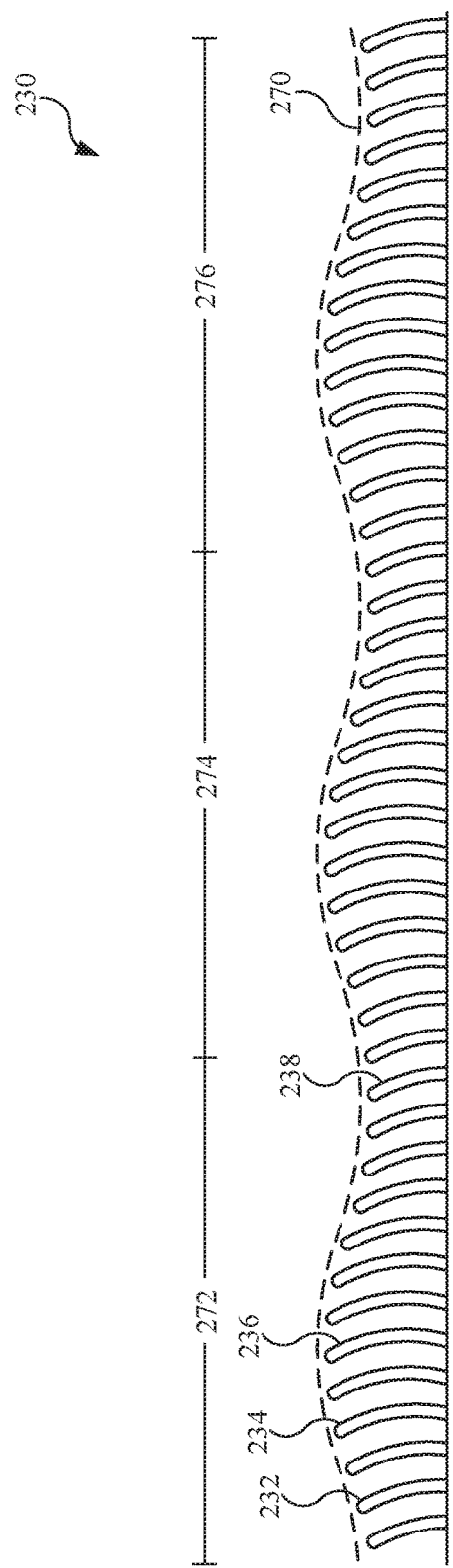
FIG. 5 illustrates a partial view of the impeller blades of the impeller shown in FIG. 4, with the impeller blades aligned along a row to show the impeller blades following a periodic pattern.

FIG. 5 illustrates a partial view of the impeller blades 230 of the impeller shown in FIG. 4, with the impeller blades 230 aligned along a row to show the impeller blades 230 following the periodic pattern 270 (denoted by the dotted lines). Further, the impeller blades 230 may be positioned along the impeller 220 (shown in FIG. 4) to define a first period 272, a second period 274, and third period 276, with each period representing a cycle. For example, when the periodic pattern 270 is a sinusoidal pattern, the first period 272 represents a cycle of a sine wave. As shown, the first impeller blade 232, the second impeller blade 234, the third impeller blade 236, and the fourth impeller blade 238 follow the first period 272, with the impeller blade lengths increasing from the first impeller blade 232 to the third impeller blade 236, and then decreasing from the third impeller blade 236 to the fourth impeller blade 238.

The first period 272 may be repeated in the form of the second period 274 and the third period 276, both of which may include a similar pattern, and in some cases, an identical pattern, as that of the first period 272. Accordingly, the second period 274 and the third period 276 may each represent a cycle of a sine wave. Also, the impeller blades 230 define a periodic pattern 270 having three periods. However, in other embodiments, the impeller blades 230 define a periodic pattern 270 having two periods or cycles. Still, in other embodiments, the impeller blades 230 define a periodic pattern 270 having four or more periods or cycles.

Figure 6:
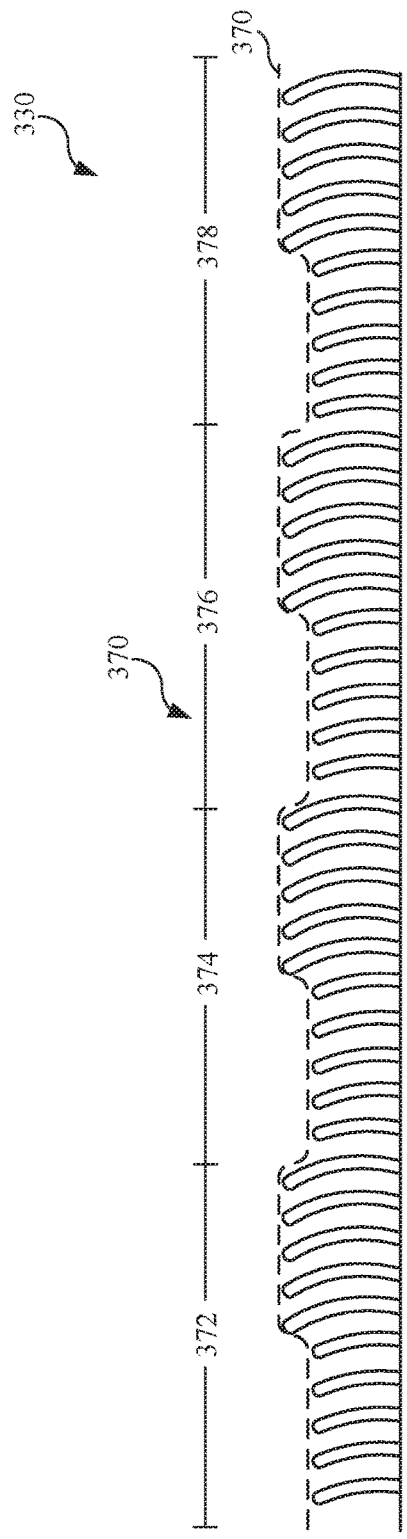
FIG. 6 illustrates a partial view of an alternate embodiment of impeller blades aligned along a row to show the impeller blades following an alternate periodic pattern.

The impeller blades may define other periodic patterns. For example, FIG. 6 illustrates a partial view of an alternate embodiment of impeller blades 330 aligned along a row to show the impeller blades 330 following an alternate periodic pattern 370. As shown, the alternate periodic pattern 370 may be representative of a square wave. Also, the alternate periodic pattern 370 includes a first period 372 and may be repeated in a second period 374, a third period 376, and a fourth period 378.

Figure 7:
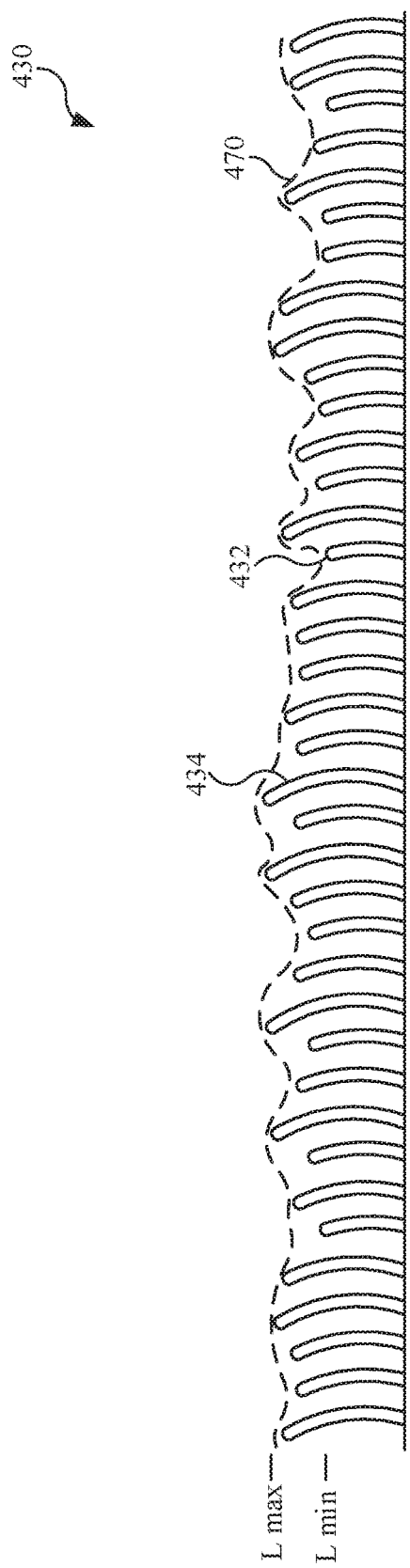
FIG. 7 illustrates a partial view of an alternate embodiment of impeller blades aligned along a row to show the impeller following a randomized configuration.

As shown and described in FIGS. 5 and 6, the impeller blades may follow a periodic pattern that is repeated a number of times. While these embodiments include blade chord lengths that follow a repeated pattern of blade chord lengths, other configurations are possible. For example, FIG. 7 illustrates a partial view of an alternate embodiment of impeller blades 430 aligned along a row to show the impeller blades 430 following a random configuration 470. A "random configuration" in this detailed description and in the claims refers to an impeller that does not include a group of impeller blades that repeats periodically, in terms of their chord lengths. In other words, an impeller with a random configuration of blades does not include a relationship in terms of blade chord length for any selected group of blades. Also, although not shown, the impeller blades 430 may be positioned along an impeller according to pseudorandom configuration, or pseudorandom function, in which the impeller blades appear to be positioned at least partially randomized along an impeller.

Despite having a random configuration, each impeller blade may be bound between a range of chord lengths. For example, as shown in FIG. 7, the impeller blades 430 are bound between a maximum blade chord length, L max, and a minimum blade chord length, L min, where L min is proportional to L max by a number approximately in the range of 0.6 and 0.95. The impeller blades 430 include a first impeller blade 432 having a chord length of L min, or approximately L min, and accordingly, the first impeller blade 432 may include a relatively short chord length. The impeller blades 430 further include a second impeller blade 434 having a chord length of L max, or approximately L max, and accordingly, the second impeller blade 434 may include a relatively long chord length. Also, the chord length for an impeller blade of L max is selected to include a chord length that provides a minimum clearance from a throat of a fan housing. This will be discussed below.

Figure 8:
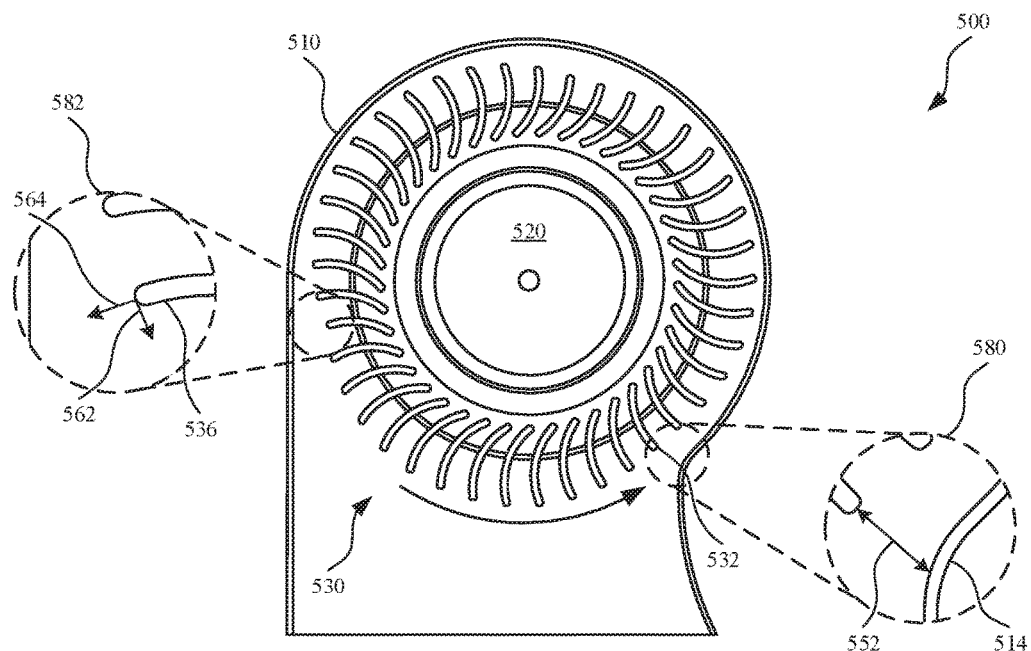
FIG. 8 illustrates a bottom view of an embodiment of a fan assembly showing rotational movement of the impeller, in accordance with the described embodiments.
Figure 9:
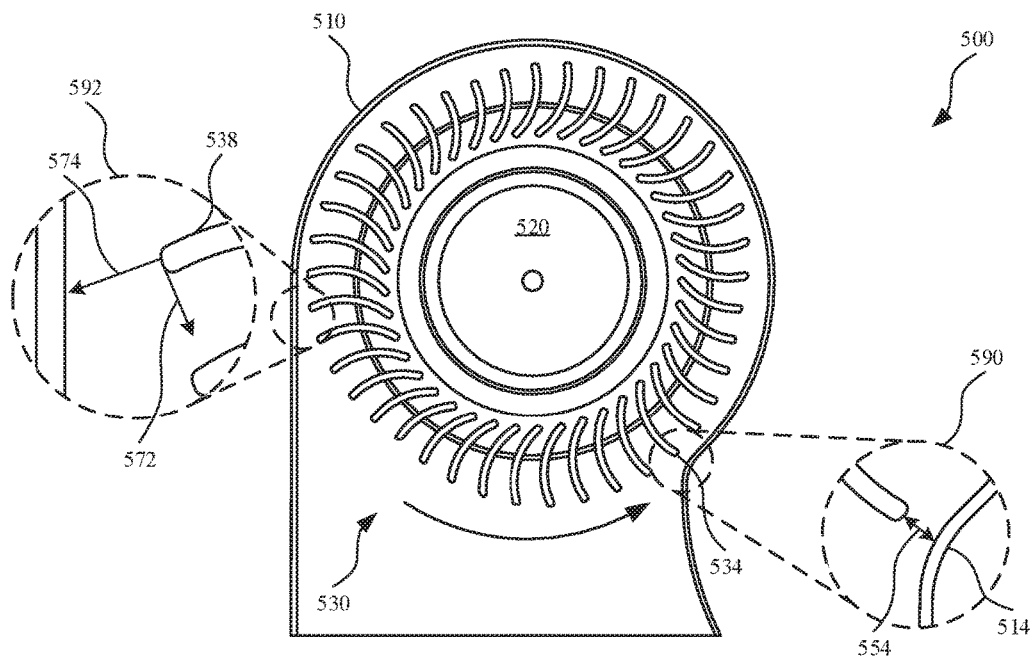
FIG. 9 illustrates a bottom view of the fan assembly shown in FIG. 8, showing additional rotation movement of the impeller with the impeller blades at a different angular position.

FIGS. 8 and 9 illustrate the relationship between the impeller blades 530 of different chord lengths passing a protruding region 514, or "throat," of a fan housing 510. The impeller 520 shown in FIGS. 7 and 8 may include any features previously described for an impeller (such as the impeller 220 shown in FIG. 4). In this regard, the impeller 520 may include impeller blades 530 that differ in chord length. The protruding region 514, shown in the first enlarged view 580, is designed to separate airflow during rotation of the impeller 520. For example, each impeller blade drives an amount air depending on the size of the impeller blade. Some of the driven air may rotate about the "scroll," or spiral-shaped design, of the fan housing 510, while a remaining portion of the air may exit through an outlet region of the fan housing 510. However, some air may impinge the protruding region 514 and stagnate on a wall defined by the protruding region 514. This may cause pressure in the form of air pressure to develop at the protruding region 514 based upon airflow generated by the impeller 520 during rotation, and will be described below.

FIG. 8 illustrates a bottom view of an embodiment of a fan assembly 500 showing rotational movement of the impeller 520, in accordance with the described embodiments. The fan assembly 500 may include a motor, not shown for purposes of simplicity, that applies a rotational force to the impeller 520. When the impeller 520 is rotated, the impeller blades 530 may pass the protruding region 514. As shown in the first enlarged view 580, a first impeller blade 532 passes the protruding region 514 of a fan housing 510 at a first distance 552. Also, the impeller blades 530 may pass the protruding region 514 according to a blade passing frequency ("BPF"), and will be discussed below.

FIG. 9 illustrates a bottom view of the fan assembly 500 shown in FIG. 8, showing additional rotational movement of the impeller 520 with the impeller blades 530 at a different angular position. As shown in the first enlarged view 590 of FIG. 9, a second impeller blade 534 passes the protruding region 514 of a fan housing 510. The second impeller blade 534 may include a chord length longer than that of the first impeller blade 532 (shown in FIG. 8). In this manner, the second impeller blade 534 passes the protruding region 514 at a second distance 554 less than the first distance 552 (shown in FIG. 8). When the second impeller blade 534 represents an impeller blade on the impeller 520 with a maximum chord length, the second distance 554 may represent a minimum radial clearance, or "throat gap," between the protruding region 514 and an impeller blade having the maximum chord length. This minimum radial clearance refers to a distance required to ensure that ensures the impeller blade of maximum chord length does not contact or rub against the protruding region 514 during rotation of the impeller 520.

Also, the minimum radial clearance may be proportional to the impeller blade having the longest chord length. For example, in FIG. 9, when the second impeller blade 534 includes a chord length equal to 30 millimeters (representing a longest impeller blade of the impeller 520), the minimum radial clearance (between the second impeller blade 534 and the protruding region 514) may be approximately 3 millimeters, or one-tenth of the length of the impeller blade of maximum chord length. In another example, when the second impeller blade 534 includes a chord length equal to 15 millimeters (representing a longest impeller blade of the impeller 520), the minimum radial clearance between the second impeller blade 534 and the protruding region 514 may be approximately 1.5 millimeters, and again, the minimum radial clearance is one-tenth of the length of the impeller blade of maximum length. Accordingly, the minimum radial clearance may vary according to the impeller blade of maximum chord length, while still ensuring the impeller blade of maximum chord length does not engage the protruding region 514.

When the impeller 520 is rotated, each impeller blade of the impeller 520 drives an amount of air. For example, referring again to FIG. 8, a second enlarged view 582 illustrates a third impeller blade 536. During rotation of the impeller 520, the third impeller blade 536 drives an amount of air that can be characterized by a velocity profile of air (driven by the third impeller blade 536). The velocity profile of air may include a radial vector 562 and a tangential vector 564. The radial vector 562 and the tangential vector 564 of the velocity profile of air corresponds to a volume air that may be at least partially exerted on the protruding region 514 when the third impeller blade 536 passes the protruding region 514. The volume of air driven by the third impeller blade 536 may generate a pressure pulse at the protruding region 514. It should be noted that an impeller blade having a size and shape similar to that of the third impeller blade 536 may include a similar velocity profile and may drive a similar amount of air.

Further, each impeller blade of the impeller 520 drives an amount of air based upon the size and shape (including chord length) of the impeller blade. For example, referring to FIG. 9, the second enlarged view 592 illustrates a fourth impeller blade 538 that may include a chord length greater than that of the third impeller blade 536 (shown in FIG. 8). During rotation of the impeller 520, the fourth impeller blade 538 includes a velocity profile of air that includes a radial vector 572 and a tangential vector 574 corresponding to a volume air that may be at least partially exerted on the protruding region 514 when the fourth impeller blade 538 passes the protruding region 514. This volume of air may generate a pressure pulse at the protruding region 514 exerted by the fourth impeller blade 538. As shown, the radial vector 572 and the tangential vector 574 of the velocity profile of the fourth impeller blade 538 is larger than that of the radial vector 562 and a tangential vector 564, respectively, of the third impeller blade 536, and accordingly, the fourth impeller blade 538 may drive a greater volume of air than that of the third impeller blade 536.

Due in part to relatively long impeller blades having a larger velocity profile and driving a larger volume of air compared to the relatively short impeller blades, a pressure pulse generated by the relatively long impeller blades at the protruding region 514 may be greater than a pressure pulse generated by the relatively short impeller blades. Accordingly, the pressure, including an amplitude of pressure, is a function of the size and shape of an impeller blade. Moreover, when an impeller blade passes the protruding region 514, the pressure pulse generated by the impeller blade may generate acoustical energy in the form of audible sound, which may be a function of pressure. Accordingly, the audible sound may vary according to the size and shape an impeller blade. As an example, during rotation of the impeller 520, when the third impeller blade 536 (shown in FIG. 8) and the fourth impeller blade 538 (shown in FIG. 9) pass the protruding region 514, the third impeller blade 536 may generate a relatively small pressure pulse and associated audible sound, as compared to a pressure pulse and associated audible sound generated by the fourth impeller blade 538.

As a result of the relatively long impeller blades driving more airflow as compared to the relatively short impeller blades, the relatively long impeller blades may provide more overall cooling performance as compared to the relatively short impeller blades. However, the relatively short impeller blades may generate less acoustic output as compared to the relatively long blades. In this regard, a fan assembly (such as the fan assembly 500 shown in FIGS. 8 and 9) having a combination of relatively long and short impeller blades may generate less overall acoustic output, or at least a perception of less acoustic output to a user, as compared to a fan assembly with blades of equal length. While the reduced acoustic output may result in less airflow and cooling performance (due to the relatively short impeller blades), the fan speed may increase in order to regain the loss in airflow and associated cooling performance. This may result in an overall better user experience as an electronic device that includes the fan assembly 500 as the electronic device may run in a relatively quieter mode with equivalent cooling capacity.

Figure 10:
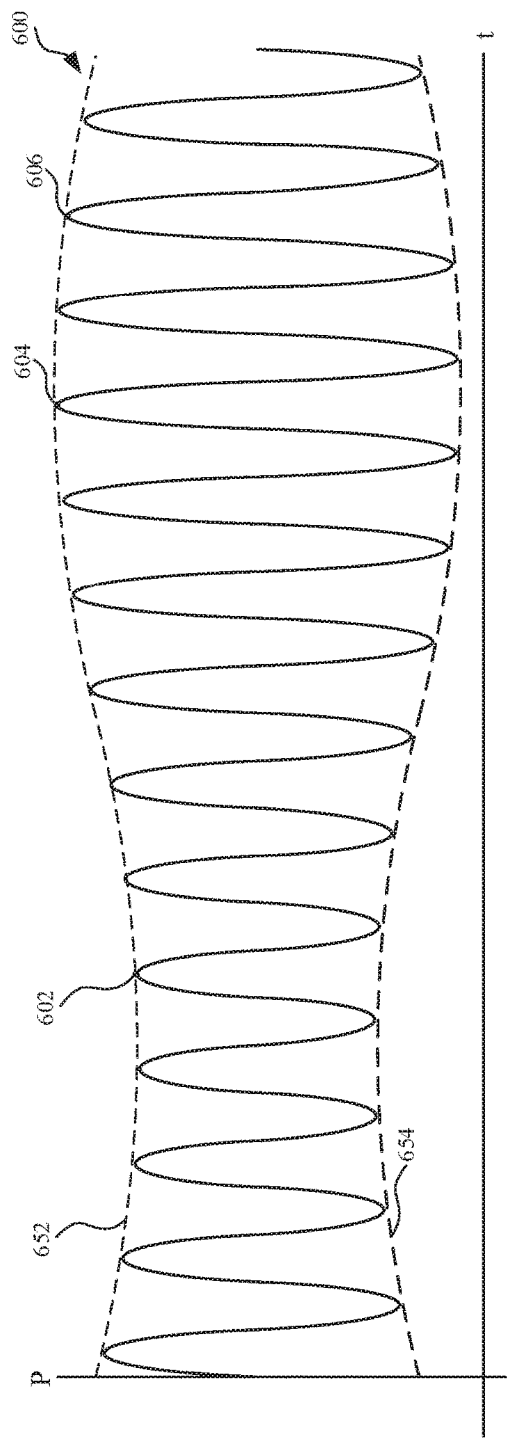
FIG. 10 illustrates a graph of acoustic pressure over time of a fan assembly.
Figure 11:
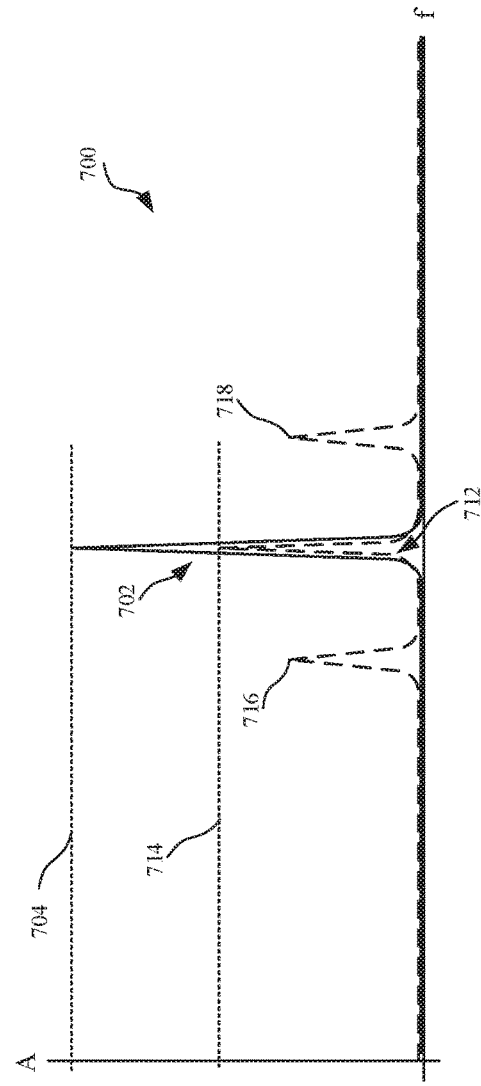
FIG. 11 illustrates a graph of amplitude over frequency of multiple fan assemblies.

FIGS. 10 and 11 illustrate several characteristics of the fan assembly 500 shown in FIGS. 8 and 9, and in particular, the acoustical characteristics associated with the impeller 520 having varying blade chord lengths. FIG. 10 illustrates a graph 600 of pressure (P) over time (t) of a fan assembly. The graph 600 may represent pressure over time of the fan assembly 500, shown in FIGS. 8 and 9. The pressure represented may take the form of air pressure, including acoustical air pressure, that may be measured at a protruding region of a fan housing (such as the protruding region 514 of the fan housing 510, shown in FIGS. 8 and 9). The graph 600 illustrates a modulated acoustic pressure, generated when the impeller 520 is rotating, along a first modulation line 652 and a second modulation line 654. The modulated acoustic pressure may be caused in part by an impeller having varying blade chord lengths (such as the impeller 520, shown in FIGS. 8 and 9) that follow a period pattern previously described.

Also, the graph 600 illustrates the acoustic pressure as a function of the chord lengths of the impeller blades. For example, the first impeller blade 532 (shown in FIG. 8) may generate a fluctuating pressure at the protruding region 514, with the pressure denoted by a first plot 602 on the graph 600. The second impeller blade 534 (shown in FIG. 9), having chord length greater than that of the first impeller blade. 532, may generate a fluctuating pressure at the protruding region 514, with the pressure denoted by a second plot 604 on the graph 600. The second plot 604, having a higher amplitude, may correspond to an increased fluctuating pressure relative to the first plot 602. The increased amplitude of pressure fluctuation may be attributed to the second impeller blade 534 having a relatively long chord length, compared to the first impeller blade 532, allowing the second impeller blade 534 to drive a greater volume of air than the first impeller blade 532. However, as a result, the second impeller blade 534 may drive some air at a velocity greater than that of the first impeller blade 532, causing increased stagnation pressure, and hence, a higher amplitude fluctuating pressure than the first impeller blade 532, resulting in a higher acoustical output caused by the second impeller blade 534 as compared to the first impeller blade 532. This is also due in part to a trailing edge of the second impeller blade 534 rotating at a greater velocity than that of the first impeller blade 532, as the trailing edge of the second impeller blade 534 is further from the center of the impeller 520 than the trailing edge of the first impeller blade 532.

Also, FIG. 10 illustrates a third plot 606, corresponding to a pressure fluctuation generated when an additional impeller blade having a chord length less than that of the second impeller blade 534. Accordingly, the lower pressure denoted by the third plot 606 is less than that of the second plot 604, indicating a decreasing pressure due to a shorter blade. During moments of relatively lower pressure, a user may perceive less acoustical output attributed to a fan assembly. Accordingly, the amplitude of pressure fluctuation is proportional to chord length of the impeller blade.

FIG. 11 illustrates a graph 700 of amplitude (A) over frequency (0 for two different fan assemblies (during operation of the fan assemblies). A first plot 702 graphs amplitude over frequency for a fan assembly having an impeller with impeller blades of equal chord length, while a second plot 712 (shown as dotted lines) graphs amplitude over frequency for a fan assembly having an impeller with impeller blades of varying chord lengths, such as the fan assembly 500 shown in FIGS. 8 and 9. A fan assembly having an impeller with several impeller blades may generate a tonal energy associated with an acoustic output at a frequency. This frequency may be referred to as the BPF of the blades passing a protruding region of a fan housing (such as the protruding region 514 of the fan housing 510, shown in FIGS. 8 and 9), with the equation for BPF given by:

$$BPF = N * \frac{RPM}{60}$$

where N equals the number of impeller blades of an impeller and RPM equals the revolutions per minute of the impeller about a rotational axis.

The first plot 702 shows a peak amplitude 704 at a particular frequency, such as the BPF. The peak amplitude 704 correspond to a spike in which the peak amplitude 704 is significantly higher than any another other amplitude along the first plot 702. By contrast, the second plot 712 shows a peak amplitude 714 significantly lower than that of the peak amplitude 704 at the BPF. As such, the acoustic tone generated at the BPF by the fan assembly with varying blade chord lengths may be less audible to the user as compared to a fan assembly having equal blade chord lengths. Further, the second plot 712 shows a frequency distribution in which the energy acoustical is spread across multiple frequencies. For example, the second plot 712 shows a first sideband having a first peak amplitude 716 at a lower frequency than the frequency associated with the peak amplitude 714. The second plot 712 further shows a second sideband having a second peak amplitude 718 at a higher frequency than the frequency associated with the peak amplitude 714. The frequencies associated with the first peak amplitude 716 and the second peak amplitude 718 may be determined by a modified equation from the above equation for determining BPF. With the overall acoustical energy spread across multiple frequencies, a user may perceive less noise associated the fan assembly having impeller blades with varying chord lengths.

Figure 12:
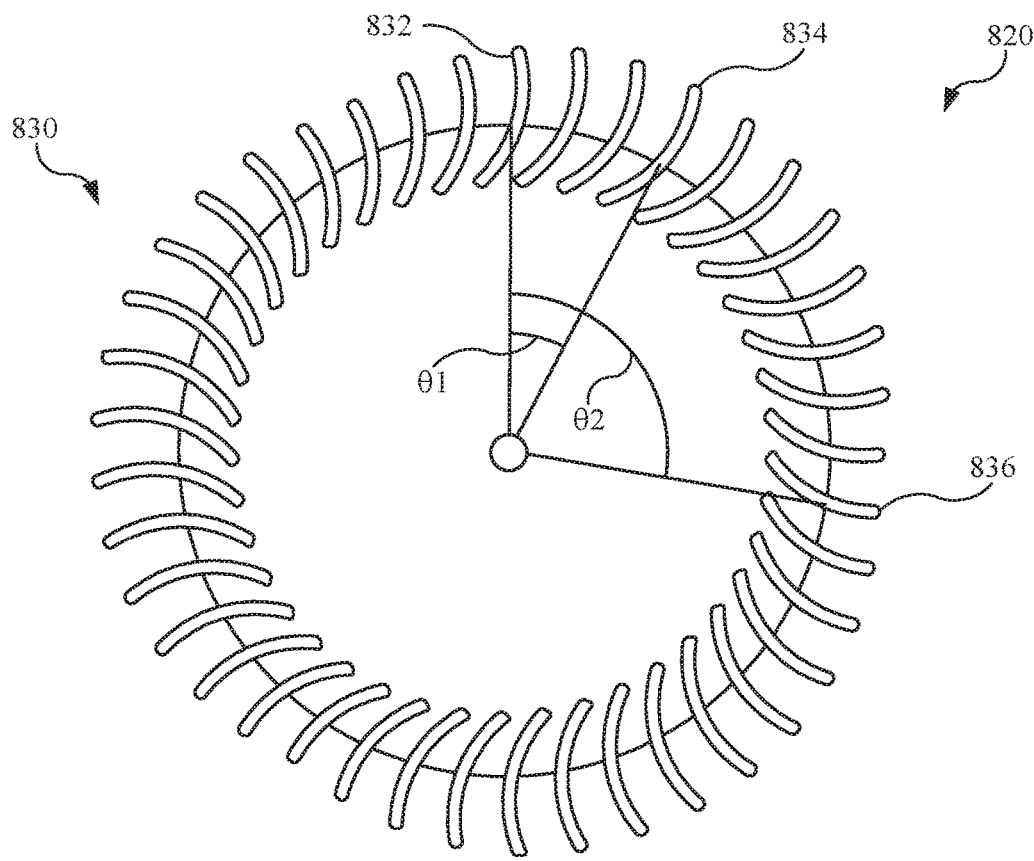
FIG. 12 illustrates a plan view of an impeller having impeller blades designed to follow a periodic pattern.

FIG. 12 illustrates an impeller 820 having impeller blades 830 following a pattern. In particular, the blade chord lengths of impeller blades 830 may include a periodic pattern in a manner previously described. The impeller blades 830 may be characterized as having an angular position on the impeller 820 in accordance with a 360-degree circle. For example, as shown in FIG. 12, the impeller 820 may include a first impeller blade 832 positioned at an angle of "zero" degrees, representative of a starting point on the 360-degree circle. Also, the impeller 820 may include a second impeller blade 834 positioned at an angle $\theta 1$ ("theta" 1) with respect to the starting point, with $\theta 1$ being an angle between 0 and 360 degrees. Further, the second impeller blade 834 includes a chord length greater than that of the first impeller blade 832. Also, the impeller 820 includes a third impeller blade 836 positioned at an angle $\theta 2$ with respect to the starting point, with $\theta 2$ also being an angle between 0 and 360 degrees. The third impeller blade 836 may include a chord length less than that of the first impeller blade 832 and the second impeller blade 834.

Figure 13:
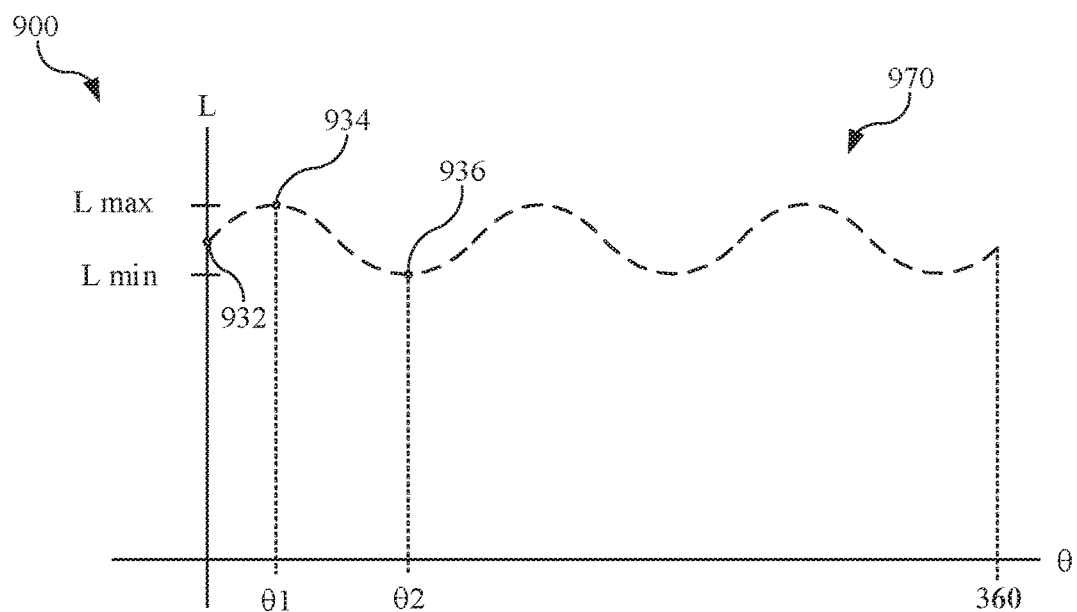
FIG. 13 illustrates a graph showing chord length versus angular position.

FIG. 13 illustrates a graph 900 of chord length, L, versus angular position, $\theta$. The graph 900 may include a plot of the impeller blades 830 shown in FIG. 12, and the associated angular positions. Also, the graph 900 shows a plot of a periodic pattern 970 along which the impeller blades 830 (collectively) follow. The periodic pattern 970 may include any function previously described for a periodic pattern. Also, the graph 900 may include a plot of chord length of an impeller blade according to an angular position of each of the impeller blades 830. For example, the graph 900 shows a first plot 932 representing a location of the first impeller blade 832 (shown in FIG. 12) along the periodic pattern 970. As shown, the first plot 932 is located on the periodic pattern 970 an angle equal to zero. The graph 900 further shows a second plot 934 of the periodic pattern 970 and representing a location of second impeller blade 834 (shown in FIG. 12) along the periodic pattern 970. As shown, the second plot 934 is located on the periodic pattern 970 at the angle, $\theta 1$. Also, as the second impeller blade 834 is longer than the first impeller blade 832, the second plot 934 denotes a length L greater than that of the first plot 932. The graph 900 further shows a third plot 936 of the periodic pattern 970 and representing a location of third impeller blade 836 (shown in FIG. 12) along the periodic pattern 970. As shown, the third plot 936 is located on the periodic pattern 970 at the angle, $\theta 2$. Accordingly, the graph 900 illustrates a change in chord length of the impeller blades 830 based on an angular position of the impeller blades 830 positioned on the impeller 820.

In addition showing an angular relationship in which the impeller blades 830, FIG. 13 further illustrates the impeller blades 830 are bound by a minimum length, L min, and by a maximum length, L max. For example, as shown in FIG. 13, the second plot 934 is located proximately at a point L max, and accordingly, the second impeller blade 834 may represent an impeller blade having the longest chord length of the impeller blades 830. With the impeller blades 830 having an upper bound at or below L max, the impeller 820, when installed in a fan assembly, will not contact certain features of a fan assembly, such as a protruding region 514 (shown in FIG. 8). Alternatively, the third plot 936 is located proximately at a point L min, and accordingly, the third impeller blade 836 may represent an impeller blade having the shortest chord length of the impeller blades 830. With the impeller blades 830 having a lower bound at or above L min, each of the impeller blades 830 may include a size and a shape to not only collectively drive airflow to provide sufficient cooling of an electronic device (that includes the impeller blades 830), but also to reduce a tonal acoustic output associated with a fan assembly that includes the impeller blades 830. Also, with this design, the impeller 820, when undergoing a rotational force in a fan assembly, may generate a modulated acoustic pressure and associated reduced tonal acoustic output in a manner previously described for an impeller.

Figure 14:
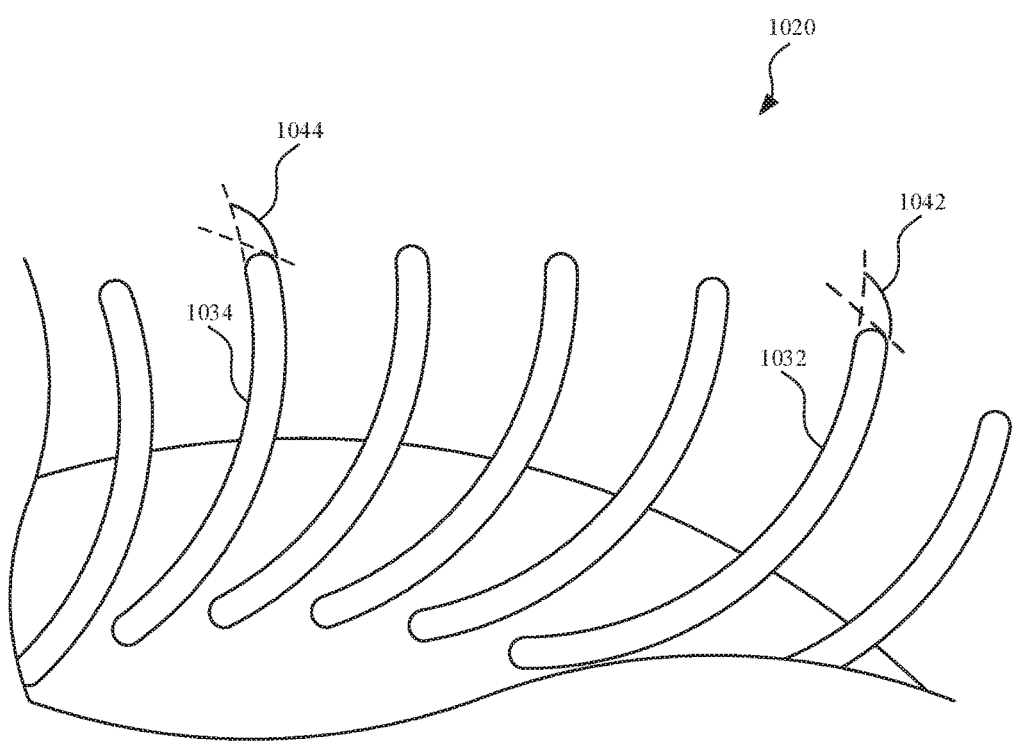
FIG. 14 illustrates a partial view of an impeller having impeller blades of varying chord lengths, in accordance with the described embodiments.

In some cases, impeller blades may undergo a cutting operation such that the impeller blades follow a pattern or random configuration. However, in order to form the impeller blades having a similar curvature from end to end, the impeller may be formed by a molding operation in which a polymeric material (used to form the impeller) is placed into a mold cavity (not shown). FIG. 14 illustrates a partial view of an impeller 1020 having impeller blades of varying chord lengths, in accordance with the described embodiments. The impeller 1020 may be formed by a molding operation (not shown) that includes, for example, an injection molding operation or a compression molding operation. As shown, the impeller 1020 includes a first impeller blade 1032 with a trailing edge having a first angle 1042 and a second impeller blade 1034 with a trailing edge having a second angle 1044. A mold cavity (not shown) may be created such that the first impeller blade 1032 includes a chord length greater than that of several other impeller blades, including a chord length of the second impeller blade 1034. However, the mold cavity may further be formed such that the first angle 1042 is substantially similar to the second angle 1044, thereby reducing the likelihood of cross flow of air during rotation of the impeller 1020. In order to achieve this, the first impeller blade 1032 may include a first curvature and the second impeller blade 1034 may include a second curvature different from the first curvature. In particular, the first curvature may be less than the second curvature such that the first impeller blade 1032 is less curved, or straighter, than the second impeller blade 1034. Sufficient care should be taken to ensure the variance between the first curvature and the second curvature is not sufficiently high in order to avoid flow separation from this blade.

Figure 15:
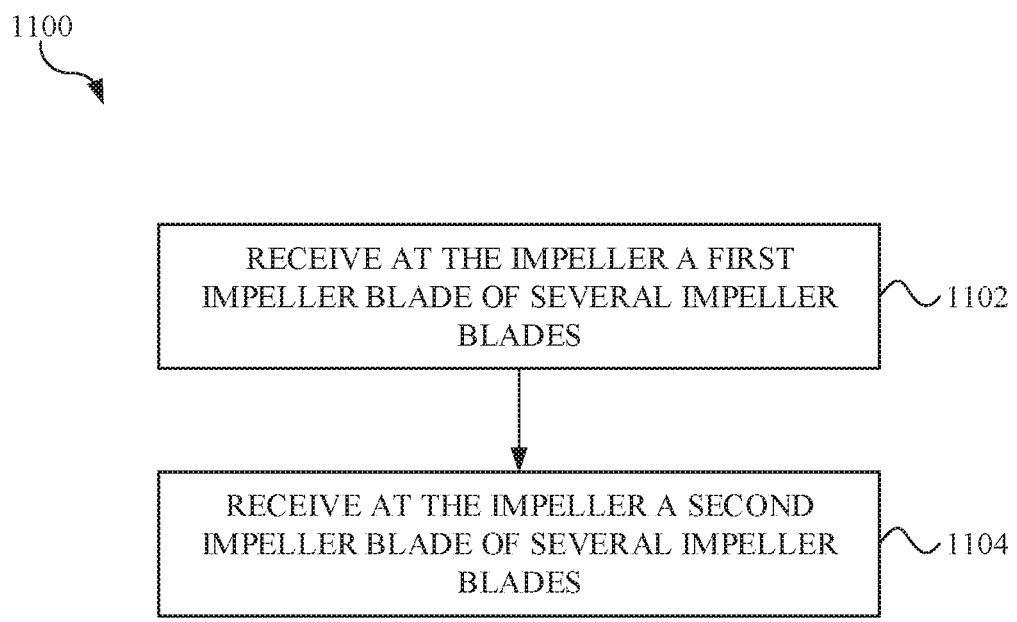
FIG. 15 illustrates a flowchart showing a method for reducing tonal acoustic output generated by a fan assembly including an impeller having several impeller blades configured to rotate with the impeller and a fan housing having a protruding region.

FIG. 15 illustrates a flowchart 1100 showing a method for reducing an acoustic tonal output generated by a fan assembly including an impeller having several impeller blades configured to rotate with the impeller and a fan housing having a protruding region, in accordance with the described embodiments. At step 1102, a first impeller blade of the plurality of impeller blades is received at the impeller. The first impeller may be molded with, or adhesively secured with, the impeller. At step 1104, a second impeller blade of the plurality of impeller blades is received at the impeller. The first impeller blade may include a chord length different from that of the second impeller blade. Also, the impeller may be designed to rotate about a longitudinal axis extending through the center of the impeller. Rotational means may be provided by a motor coupled with the impeller. In this manner, in response to a rotational force to the impeller, the first impeller blade passes the protruding region at a first distance from the protruding region and the second impeller blade passes the protruding region at a second distance from the protruding region. Due to the differences in chord lengths, the second distance is different from the first distance. The varying chord lengths may be due in part to a cutting operation and/or a molding operation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A fan assembly suitable for use in a consumer electronic device, the fan assembly comprising:
   an impeller; and
   a plurality of impeller blades secured with the impeller, the plurality of impeller blades configured to rotate with the impeller in response to a rotational force applied to the impeller, wherein the plurality of impeller blades include blades of different chord lengths that follow a sinusoidal pattern that spreads an acoustic tonal output generated while the impeller is rotating to reduce a perception of the acoustic tonal output, and wherein adjacent impeller blades of the plurality of impeller blades comprise an equal angular spacing.

2. The fan assembly of claim 1, wherein the plurality of impeller blades comprises a first impeller blade having a longest blade length of the plurality of impeller blades and a second impeller blade having a shortest blade length of the plurality of impeller blades, and wherein a ratio of the shortest blade length to the greatest blade length is approximately 0.9.

3. The fan assembly of claim 1, wherein the pattern followed by the plurality of impeller blades comprises a pseudorandom configuration.

4. The fan assembly of claim 1, further comprising a fan housing that covers the impeller, the fan housing comprising a protruding region separated by the plurality of impeller blades by a minimum radial clearance.

5. A fan suitable for use in a consumer electronic device, the fan comprising:
   a blade assembly comprising blades of varying chord lengths, wherein the blades rotate around a common center of rotation, and wherein adjacent blades comprise an equal angular spacing;
   a fan housing that carries the blade assembly, the fan housing comprising a protruding region, wherein the varying blade chord lengths vary within a range from a minimum blade chord length to a maximum blade chord length, the maximum blade chord length corresponding to a minimum radial clearance between the maximum blade chord length and the protruding region.

6. The fan of claim 5, wherein each of the blades, when rotating, produces corresponding pressure pulses at the protruding region, the pressure pulses having an amplitude associated with an acoustic tonal energy and an acoustical tonal frequency distribution proportional to a rotational frequency of the blade assembly.

7. The fan of claim 6, wherein a passage of the blade assembly at the protruding region causes a corresponding variation in the amplitude and the acoustic tonal frequency distribution.

8. The fan of claim 5, wherein the blade assembly comprises:
   a first impeller blade having a first chord length;
   a second impeller blade having a second chord length different from the first chord length; and
   a third impeller blade having a third chord length different from the first chord length and the second chord length, wherein the first impeller blade, the second impeller blade, and the third impeller blade combine to define at least part of a periodic pattern of the blade assembly.

9. A method for reducing an acoustic tonal output generated by a fan assembly including an impeller having a plurality of impeller blades configured to rotate with the impeller and a fan housing having a protruding region, the method comprising:

receiving at the impeller a first impeller blade of the plurality of impeller blades; and receiving at the impeller a second impeller blade of the plurality of impeller blades, wherein in response to a rotational force to the impeller, the first impeller blade passes the protruding region at a first distance from the protruding region and the second impeller blade passes the protruding region at a second distance from the protruding region, the second distance different from the first distance, wherein the plurality of impeller blades comprises an even angular spacing between adjacent blades of the plurality of impeller blades.

10. The method of claim 9, further comprising receiving at the impeller a third impeller blade of the plurality of impeller blades, wherein in response to the rotational force to the impeller, the third impeller blade passes the protruding region at a third distance from the protruding region, the third distance different from the second distance and the first distance.

11. The method of claim 10, wherein receiving at the impeller the first impeller blade, the second impeller bladed, and the third impeller blade comprises forming a periodic pattern defined by the first impeller blade, the second impeller bladed, and the third impeller blade.

12. The method of claim 11, wherein forming the periodic pattern comprises forming a sinusoidal pattern.

13. The method of claim 9, further comprising in response to the rotational force to the impeller, forming a first peak amplitude of the acoustic tonal output when the first impeller blade passes the protruding region, and forming a second peak amplitude of the acoustic tonal output when the second impeller blade passes the protruding region, the second peak amplitude different from the first peak amplitude.

14. The method of claim 9, wherein in response to the rotational force, the plurality of impeller blades include blades follow a pattern that spreads the acoustic tonal output generated while the impeller is rotating to reduce a perception of the acoustic tonal output.

* * * * *

UNITED STATES PATENT AND TRADEMARK OFFICE
CERTIFICATE OF CORRECTION

PATENT NO. : 10,422,350 B2
APPLICATION NO. : 15/201278
DATED : September 24, 2019
INVENTOR(S) : Herrou et al.

Page 1 of 1

It is certified that error appears in the above-identified patent and that said Letters Patent is hereby corrected as shown below:

In the Claims

Claim 11, Column 16, Lines 5 and 8: delete the word "bladed" and insert the word --blade-- (two occurrences)

Claim 14, Column 16, Line 20: add the word --that-- after the word "blades" and before the word "follow"

Signed and Sealed this
Twenty-ninth Day of October, 2019

Andrei Iancu
*Director of the United States Patent and Trademark Office*